United States Patent
Landingham et al.

(10) Patent No.: US 9,840,443 B2
(45) Date of Patent: Dec. 12, 2017

(54) PROCESSING OF NON-OXIDE CERAMICS FROM SOL-GEL METHODS

(71) Applicant: Lawrence Livermore National Security, LLC, Livermore, CA (US)

(72) Inventors: Richard Landingham, Livermore, CA (US); Robert A. Reibold, Salida, CA (US); Joe Satcher, Patterson, CA (US)

(73) Assignee: Lawrence Livermore National Laboratory, LLC, Livermore, CA (US)

( * ) Notice: Subject to any disclaimer, the term of this patent is extended or adjusted under 35 U.S.C. 154(b) by 422 days.

(21) Appl. No.: 14/515,689

(22) Filed: Oct. 16, 2014

(65) Prior Publication Data

US 2016/0194251 A1     Jul. 7, 2016

Related U.S. Application Data

(60) Provisional application No. 61/891,702, filed on Oct. 16, 2013.

(51) Int. Cl.

| | |
|---|---|
| C04B 35/624 | (2006.01) |
| C04B 35/571 | (2006.01) |
| C04B 35/563 | (2006.01) |
| C04B 35/56 | (2006.01) |
| C04B 35/589 | (2006.01) |
| C04B 35/58 | (2006.01) |
| C01B 21/06 | (2006.01) |
| C01B 35/04 | (2006.01) |
| C04B 35/581 | (2006.01) |
| C04B 35/626 | (2006.01) |
| C04B 35/645 | (2006.01) |
| C22C 29/08 | (2006.01) |
| B22F 3/23 | (2006.01) |
| C01B 32/90 | (2017.01) |
| C01B 32/956 | (2017.01) |
| B22F 3/105 | (2006.01) |
| B22F 3/15 | (2006.01) |
| B22F 3/20 | (2006.01) |
| B22F 5/00 | (2006.01) |

(52) U.S. Cl.
CPC ............ *C04B 35/624* (2013.01); *B22F 3/23* (2013.01); *C01B 21/06* (2013.01); *C01B 32/90* (2017.08); *C01B 32/956* (2017.08); *C01B 35/04* (2013.01); *C04B 35/563* (2013.01); *C04B 35/5611* (2013.01); *C04B 35/571* (2013.01); *C04B 35/58* (2013.01); *C04B 35/581* (2013.01); *C04B 35/5805* (2013.01); *C04B 35/589* (2013.01); *C04B 35/58014* (2013.01); *C04B 35/58057* (2013.01); *C04B 35/58064* (2013.01); *C04B 35/58071* (2013.01); *C04B 35/6265* (2013.01); *C04B 35/62655* (2013.01); *C04B 35/645* (2013.01); *C22C 29/08* (2013.01); *B22F 3/105* (2013.01); *B22F 3/15* (2013.01); *B22F 3/20* (2013.01); *B22F 2003/208* (2013.01); *B22F 2005/001* (2013.01); *C04B 2235/3206* (2013.01); *C04B 2235/3208* (2013.01); *C04B 2235/3217* (2013.01); *C04B 2235/3232* (2013.01); *C04B 2235/3244* (2013.01); *C04B 2235/3258* (2013.01); *C04B 2235/3409* (2013.01); *C04B 2235/3418* (2013.01); *C04B 2235/441* (2013.01); *C04B 2235/48* (2013.01); *C04B 2235/666* (2013.01); *C04B 2235/781* (2013.01)

(58) Field of Classification Search
CPC ..... C01B 21/06; C04B 35/56–35/5755; C04B 35/624; C04B 2235/781
See application file for complete search history.

(56) References Cited

U.S. PATENT DOCUMENTS

2007/0167534 A1 *   7/2007   Coronado ................ C08J 9/28
521/64

FOREIGN PATENT DOCUMENTS

DE      4343534 A1 *  6/1995  ......... C04B 35/5603

OTHER PUBLICATIONS

DE 4343534 (Preiss) Jun. 22, 1995 (English language machine translation). [online] [retrieved Mar. 7, 2017]. Retrieved from: Espacenet.*

* cited by examiner

*Primary Examiner* — Erin Snelting
(74) *Attorney, Agent, or Firm* — Harness, Dickey & Pierce, P.L.C.

(57) ABSTRACT

A general procedure applied to a variety of sol-gel precursors and solvent systems for preparing and controlling homogeneous dispersions of very small particles within each other. Fine homogenous dispersions processed at elevated temperatures and controlled atmospheres make a ceramic powder to be consolidated into a component by standard commercial means: sinter, hot press, hot isostatic pressing (HIP), hot/cold extrusion, spark plasma sinter (SPS), etc.

36 Claims, No Drawings

PROCESSING OF NON-OXIDE CERAMICS FROM SOL-GEL METHODS

CROSS-REFERENCE TO RELATED APPLICATIONS

This application claims the benefit of U.S. Provisional Application No. 61/891,702, filed on Oct. 16, 2013. The entire disclosure of the above application is incorporated herein by reference.

STATEMENT OF GOVERNMENT RIGHTS

The United States Government has rights in this invention pursuant to Contract No. DE-AC52-07NA27344, between the U.S. Department of Energy and Lawrence Livermore National Security, LLC, for the operation of Lawrence Livermore National Laboratory.

INTRODUCTION

Non-oxide ceramics materials, such as those based on carbides, nitrides, and borides, are used as materials in a variety of applications. Non-limiting examples include armor, transparent ceramics for lasers, electronic devices and switches, cutting tools, radiation detector components, catalysts, insulation, high strength materials, high temperature materials, and the like. Current processing of carbides, nitrides, and borides or mixtures of these materials proceeds by forming the desired compound in a high temperature reaction process. The resulting products are then ground to a desired particle size for consolidation as powder into a component.

The known process is relatively expensive and limits how fine a powder can be prepared. As a result, the process limits how good a dispersion can be achieved and/or results in a contamination of powder. In a typical grind, the powders produced are on the order of a 1000 nanometers at least and contain contamination from the mixing apparatus, such as when ground by steel balls. In addition, the grinding process provides for poor mixing of powders.

After the powders are formed in this way, they are consolidated into a component using standard commercial means, such as sintering, hot pressing, hot isostatic pressing (HIP), hot or cold extrusion, spark plasma sintering (SPS), and the like. The strength and other characteristics of the consolidated material depends in many ways on the quality of the powder, including its grain size and quality of mixing. Improved methods of making non-oxide products such as WC, TiC, SiC, and $B_4C$ would represent a significant advance.

SUMMARY

A general procedure has been developed that can be applied to a variety of sol-gel precursors and solvent systems. Sol-gel processing eliminates some disadvantages of prior methods by using pure chemicals to form a mixture of oxides and organic binders that are subsequently reacted at low temperatures in controlled environments to form very fine particles of the desired powder or porous ceramic bodies.

Sol-gel processing of pure chemicals according to the disclosure is used to form blends of oxides and organics that are then reaction heat treated in controlled environments to form metals, oxides, carbides, nitrides, or borides of fine powders, blends of powders, and/or porous components. Fine particles can also be added during the sol-gel process to improve dispersion of such particles.

Advantageously, sol-gel processing of pure chemicals is an inexpensive method of producing very fine oxides, such as $WO_3$, $TiO_2$, $SiO_2$, and $B_2O_3$ and the like. Forming these fine oxides within a web of organic material allows subsequent controlled reactions between the oxides, the organic materials, and the controlled environments. The reactions disclosed here convert these oxides to other desired powders and components of greater commercial value like the corresponding carbides, nitrides, and borides.

A method according to the disclosure involves the steps of forming an intimate mixture of an inorganic oxide and organic polymer, followed by reaction heat treating the mixture to form particles of a non-oxide ceramic. Thereafter, the particles are consolidated into a solid ceramic object. Advantageously, the solid ceramic object is characterized by a domain size of 100 nanometers or less.

The intimate mixture is one formed using a sol-gel process. In an embodiment, a first sol and a second sol are formed in a solution, wherein the first sol is an inorganic gel intermediate (i.e., an intermediate in the formation of an inorganic gel via the sol-gel process) and the second sol is, in similar fashion, an organic gel intermediate. Reaction in the solution continues under sol-gel conditions until at least one of the first sol and the second sol forms a gel comprising the respective inorganic oxide or organic polymer. The result in some embodiments is a interpenetrating network of inorganic oxide and organic polymer. The solvent is then removed from the solution to form the intimate mixture. As a result of the sol gel processing, the domain size of resulting particles is defined by the pore size of the intimate mixture or the interpenetrating network. Advantageously, the domains are characterized by dimensions of 100 nanometers or less, such as 50 nanometers or less, and 20 nanometers or less.

DESCRIPTION

According to various embodiments of the disclosure, sol-gel processing is used to create interpenetrating networks of two sol-gel chemistries. In sol gel processing, one begins with a solution of starting monomers (precursors) in a solvent such as water at low viscosity. Upon reaction for an initial time, the monomer precursors form a colloidal dispersion of a polymeric material called a sol. Upon reaction for a further time under the right conditions, the sol progresses until a gel is formed in the solution. To illustrate, a commonly gel made by such a process is a silica gel. To make a silica gel, a monomer such as TEOS (tetraethylorthosilicate) is provided with a low pH or added acid and hydrolysis begins. As some of the TEOS monomers polymerize and form extended siloxane networks in the solution, a colloidal suspension or sol is formed. Upon more reaction time, the sol further reacts and crosslinks until the network essentially fills the volume of the solution to form a gel. Although such gels readily form, there is an empirical component to adjusting the conditions so that the desired component forms. If the conditions are such that the reaction is too slow, the gel does not form and one achieves only a viscous fluid. On the other hand, if the kinetics are too fast, the sol forms too fast to remain in suspension and forms a precipitate.

In one aspect of the current disclosure, the sol-gel processing involves forming two sols simultaneously in the presence of one another, wherein at least one of the sols proceeds until a full gel is formed in the solution. An advantage of the method is that the sols and gel material have nanometer-sized pores. Since both gels are essentially being formed simultaneously, the two materials form in the pores of one another. Since the pores are nanosized, the solid remaining when solvent is removed is an intimate mixture based on interpenetration of the pores on the nano-scale. This intimate mixing of the two material leads to advantages of the method as described further herein.

In methods according to the current disclosure, the first sol is an inorganic oxide, and the second sol is made of an organic polymer. Suitable starting materials (precursor monomers) for both the inorganic oxide and organic polymer are described further herein. In one embodiment, a gel of the inorganic oxide forms at the same time a gel of the organic polymer is formed. If both gels form, the structure created is an interpenetrating network having two independent networks of materials. If one gel forms and the second does not fully form, then sol particles of one of the materials are held in the pores of the gel of the other material. One of the materials is fully immobilized (the one that has formed the gel), while the other material tends to migrate partially out of the pores of the other material upon removal of the solvent. In such a situation, subsequent heat treating of the intimate mixture will tend to overcoat the fully gelled material to at least a slight extent. But an intimate mixture of the two materials is still formed upon removal of the solvent. And the material remaining after subsequent reaction heat treatment contains particles with nanometer sized domains that provide useful ceramic articles upon consolidation.

In one embodiment, a method involves forming an intimate mixture of an inorganic oxide and organic polymer, reaction heat treating the mixture to form particles of a non-oxide ceramic, and consolidating the particles into a solid ceramic object. Advantageously, the solid ceramic object is characterized by a domain size of 100 nanometers or less. In various embodiments, the non-oxide ceramic is a carbide, a nitride, or a boride. The organic polymer is one that will form a gel in solution, such as a polymer of aldehyde and a mono-, di-, or a trihydroxy-substituted aromatic ring. Examples of such polymers include phenol formaldehyde resins, polymers of dihydroxybenzene (resorcinol) and formaldehyde, and polymers of trihydroxybenzene (such as phloroglucinol) and formaldehyde.

Forming an intimate mixture involves sol gel processing. In one embodiment, it involves forming a first sol comprising an inorganic gel intermediate in a solution, forming a second sol comprising an organic gel intermediate in the solution, and further reacting in the solution until at least one of the first sol and second sol forms a gel comprising the respective inorganic oxide or organic polymer. The gel is formed when the mixture has set up and has no fluid flow capability. Thereafter, solvent is removed from the solution to form the intimate mixture.

In another embodiment, the intimate mixture is formed by reacting monomer precursors of a first sol in a solution and reacting monomer precursors of a second sol in the solution. As before, the reaction is carried out in the solution for a time sufficient to form a gel from at least one of the first and second sols. Thereafter as before, the solvent is removed from the solution to form the intimate mixture. The first sol comprises an inorganic oxide and the second sol comprises an organic polymer. As noted above, the method involves forming an interpenetrating network of two sol gel chemistries in a solution and then removing the solvent from the solution to form the intimate mixture for further processing.

To make an interpenetrating network, two sol-gel processes are carried out simultaneously. One way of doing this is to react first starting monomers of a first sol in a solution and reacting second starting monomers of a second sol in the same solution. Then the first and second starting monomers are reacted in the solution until at least one of the first sol and the second sol completely reacts to form a gel in the solution. At that point, the solution forms a gel mixture. Thereafter, the solvent is removed from the gel mixture to form a mixture of inorganic oxide and organic polymer. The mixture is then reaction heat treated to form particles of non-oxide ceramic such as carbides, nitrides, and borides.

In this aspect, at least one of the first starting monomers and the second starting monomers react completely to form a gel in the solution. In some embodiments, the other starting monomers also form a gel in the solution, after which the solvent is removed and the mixture subjected to reaction heat treating. In another aspect, only one of the first starting monomers and the second starting monomers proceed to form a gel in the solution, while the other starting monomers form a polymeric material that stops short of forming a gel. In both of these variations, the first starting monomers and the second starting monomers are reacting in the solution at the same time.

In another embodiment, the method involves forming a first gel comprising inorganic oxide in a solution and forming a second gel comprising organic polymer in the solution to form a gel mixture. Thereafter, the solvent is removed from the gel mixture to form a blend of inorganic oxide and organic polymer. The mixture is then reaction heat treated to form particles of non-oxide ceramic such as carbides, nitrides, and borides.

In one variation of the above methods, the starting materials for both gels are combined in the solution at the same time at the beginning of the reaction. Reaction then proceeds to form each gel in the presence of the other gel. In other variations, one of the polymerizations or gel reactions is begun and continued for a time, at which later time either a) the precursor monomers of the other gel material are added, or b) a catalyst or initiator is added to a solution containing the precursor monomers in order to begin the polymerization reaction. In various embodiments, base or acid is used as the catalyst or initiator. Certain of the polymeric gels can be initiated with either acid or base. Systems with such gels are flexible, since they can be used together with either base-initiated or acid-initiated inorganic gels. The precise timing and order of addition of the respective precursor monomers depend on the nature of the monomers, and on the relative kinetics of sol- and gel formation. Examples of reaction conditions are given in the working examples that follow.

Inorganic Oxides

Sols and gels of inorganic oxides are formed using known methods and chemistries.

In various aspects, methods described herein involve forming an intimate mixture of an inorganic oxide and an organic polymer. An inorganic oxide as used herein refers to a solid having an extended network of element/oxygen/element bonds that can be synthesized by employing sol-gel reaction conditions known in the art. Thus, inorganic oxides include those reachable by known sol-gel procedures.

In some embodiments, the inorganic oxides are oxides of a transition metal or an alkaline earth metal, where the element of the element/oxygen/element bonds is traditionally classified as a metal. In such cases, the inorganic oxides can be referred to as metal oxides. Other inorganic oxides according to the disclosure are made from elements that are traditionally classified as metalloids (e.g. Al, Mg, Ga, Ge).

Oxides of non-metals such as silica and oxides of boron are also included in the term "inorganic oxide."

Elements known to form gels of metal oxide from a sol gel process include Sc, Ti, V, Cr, Mn, Fe, Co, Ni, Y, Zr, Nb, Mo, La, Hf, Ta, and W of the transition metals. Further examples include Ga, Ge, In, Al, Sn, and Sb of the metalloids. Further example includes lanthanides selected from Ce, Pr, Nd, Sm, Eu, Gd, Tb, Dy, Ho, Er, Tm, Yb, Lu, and actinides selected from Th and U. Finally, as noted the oxide can be a compound of B or Si.

Inorganic oxides are formed by using a sol-gel process. In a sol-gel process, starting materials are dissolved in a solvent and an initiator or catalyst is added to begin the reaction. The reaction is also controlled by temperature and pH. The starting materials consist of starting monomers or monomer precursors selected according to the conditions and the known chemistry for any individual element. Starting materials include oxides, alkoxides, halides, nitrates, and other suitable compounds of the respective element that makes up the inorganic oxide. Although the terms "starting monomers" and "monomer precursors" are given in the plural, it is to be understood that for many inorganic oxides, only a single precursor reacts to incorporate elements in the extended oxide network. In these cases, other "monomers" or precursors are understood to include catalysts such as acids or bases that are used to initiate the reaction, as well as any other auxiliary components or initiators. The plural also accounts for embodiments where the inorganic oxide is formed from more than one element. To illustrate, reaction is carried out in a suitable solvent such as water or an organic solvent and is typically initiated by adding acid or base to the solution of the monomer precursor(s) in the solvent. Suitable starting materials and conditions for forming gels and extended networks of inorganic oxides are given in the examples.

For convenient reference, the class of materials selected from oxides, nitrides, carbides, borides of these elements are referred to herein as ceramics, oxide ceramics, and non-oxide ceramics, depending upon the context.

Organic Polymers

At the same time that a sol or a gel of the inorganic oxide is being formed, a sol-gel reaction is carried out that can result ultimately in formation of a gel of an organic polymer. Certain polymers are known to form such gels. In a typical reaction, starting monomers (which are also called by the term monomer precursors or equivalent nomenclature) are dissolved in a suitable solvent and the polymerization initiated with catalyst or initiators. One family of suitable polymers is a copolymer of an aldehyde and a monomer containing an activated aromatic ring. Suitable aromatic rings or starting monomer of the polymers include phenol or other aryl rings substituted with 1, 2, or 3 hydroxyl groups. Examples include copolymers of formaldehyde and phenol (so-called phenol formaldehyde resins), copolymers of formaldehyde and dihydroxybenzene (such as resorcinol), and copolymers of formaldehyde and trihydroxybenzene (such as phloroglucinol).

Other polymers can be used as long as their synthesis is amenable to the sol-gel process. This is especially true if the gel of organic polymer is to be the primary gel. Examples include isocyanate polymers (polyurethanes and polyureas, for example) and cellulose polymers.

As noted above, suitable results are observed in systems of the disclosure as long as one of the gels is fully formed and its pores contain particles of the other material. As relevant here, it is possible to use organic polymers that form less than an ideal gel under the sol gel conditions as long as the metal oxide is one that is fully gelled under the conditions.

Reaction Heat Treating

After the gel mixture is formed, the solvent is removed from the gel mixture, leaving the intimate mixture of inorganic oxide and organic polymer. Solvent can be removed by any convenient means such as freeze drying and spray drying. After the solvent is removed, the resulting intimate mixture is subject to reaction heat treating conditions to make carbides, nitrides, borides, or other materials.

Heating the intimate mixture in an inert atmosphere and/or in the presence of hydrogen tends to lead to formation of carbides under the reaction heat treating conditions, with the carbon being supplied by the polymer gel. It has been found that the use of hydrogen in the atmosphere for reaction heat treating makes it easier to remove oxygen from the intimate mixture of materials so that the oxide material is fully converted to the carbide.

To make nitrides, a nitrogen component is included in the atmosphere in which the reaction heat treating is carried out. Suitable nitrogen containing components here include ammonia ($NH_3$) and nitrogen gas ($N_2$). In addition or alternatively, non-reacting nitrogen components can be included in the initial mixture of starting monomers of the respective gel components, where they survive the sol gel reaction and become part of the gel mixture. Upon removal of the solvent, the additional nitrogen components are part of the intimate mixture. Then, upon reaction heat treating the components supply nitrogen for the reaction that takes the metal oxide to a metal nitride. Examples include non-volatile and non-reactive nitrogen salts such as ammonium salts (e.g. ammonium hydroxide), nitrate salts, and the like.

In a similar way, to make borides, boron compounds are included in the reaction heat treating conditions. In one embodiment, a boron compound is added to the intimate mixture before the reaction heat treating. Alternatively or in addition, boron compounds can be provided in the original reaction vessel and become part of the gel mixture, and of the intimate mixture upon solvent removal. Suitable boron compounds include $B_2O_3$, $H_3BO_4$, and salts of boron such as $Na_2B_4O_7$.

Doping with Non-Oxide Components

The sol-gel reaction mixtures can be doped with other components that survive the sol-gel conditions and are incorporated into a ceramic powder after the reaction heat treating is carried out. An example is adding a metal salt to the initial solution of precursors of the respective sols, so that the metal salt becomes a part of the gel mixture and of the intimate mixture resulting from solvent removal. The metal salt is then subject to heat treating conditions where the salt is reduced to the metal under the influence of carbothermal reduction. In this way, non-oxide ceramic materials can be made that, for example, have finely dispersed metal. An example is the tungsten carbide/cobalt cutting tool material exemplified in one of the examples.

Consolidating Non-Oxide Ceramic Powders

The product of forming the intimate mixture and subjecting the intimate mixture to reaction heat treating conditions is a powdered ceramic material characterized by a domain size less than 100 nanometers, and typically less than 50 nanometers, or less than 20 nanometers. The grain size can be measured by x-ray diffraction means or electron microscope (SEM, TEM, etc.) means.

Such a powder is consolidated into solid materials for known applications by standard commercial means such as sintering, hot pressing, hot isostatic pressing (HIP), hot/cold extrusion, spark plasma sintering (SPS) and the like. It is believed that the small domain sizes achievable by using the methods described herein contribute to the favorable properties of solid ceramic materials so produced.

EXAMPLES

Example 1—Preparation of WC with a Fine Dispersion of Co

Preparation of WC gels containing 8% Co is described here. Materials used are: 1) Tungsten Source: 0.697 M $Na_2WO_4$; 2) Dowex 50W2X-100; 3) Carbon Source: 1.70 g Phloroglucinol, 1.75 g Formaldehyde 37%, 80.0 g $H_2O$, and 0.04 g $Ca(OH)_2$; and 4) Cobalt Source: 0.349 M $Co(C_2H_3O_2)_2$.

Prepared an ion exchange column using 30.6 g Dowex 50W2X-100 resin. Washed with deionized water to remove orange color.

To a 250 ml beaker equipped with a Teflon® stirrer, the carbon source constituents (monomer precursors for the organic polymer) were added and heated gently until a clear yellow green solution was obtained. 10 mL of the solution was combined with 2.5 mL of the cobalt solution with stirring.

Apply the sodium tungstate to the column and collect $H_2WO_4$ from ion exchange column at pH 1 as indicated with Hydrion paper. Add 5 ml of this solution to the carbon source plus cobalt with stirring. Let sit to gel overnight. Freeze dry or spray dry gel to remove solvent.

Place the above powder product into a graphite crucible and reaction heat treat the powder at 1000° C. for four hours in flowing mixture of 4% $H_2$-argon gas. The resulting powder is a fine blend of tungsten carbide (WC) with cobalt (Co) metal dispersed uniformly throughout the powder blend. This blend is then consolidated by commercial sintering processes into WC—Co cutting tools.

Example 2—Preparation of TiC Gels

Organic polymer precursors are 6.126 g Resorcinol, 9.025 g Formaldehyde 37%, 22 g water, 0.380 g acetic acid (AcOH).

Beaker A: To a beaker equipped with a stir bar, add resorcinol and water to dissolve. Add formaldehyde and AcOH.

Inorganic oxide precursors are 124 g $Ti(OC_2H_5)_4$ tech grade, 10 g AcOH, 300 g ethanol (EtOH).

Beaker B: To a beaker equipped with a stir bar, add $Ti(OC_2H_5)_4$, EtOH and AcOH. Add contents of beaker B to beaker A while stirring. Cover and place in oven at 50° C. for 24 hrs. Remove solvent by heating at an elevated temperature, such as 90° C. under an inert atmosphere, then heat treat at 1100° C. in flowing 4% hydrogen in argon to make TiC.

Example 3—Preparation of $B_4C$ Gels 1.71 grams phloroglucinol, 1.75 grams formaldehyde 37% aq., 80 grams water, and 1.40 grams $B_2O_3$ were heated while stirring on a hot plate. 0.04 grams $Ca(OH)_2$ was added at 47° C., then removed from heat. Let stand at room temperature to gel to an opaque yellow in 10 minutes. Placed in freezer, then freeze dried to remove solvent. Suitable materials substituting for $B_2O_3$ would include the acids of boron such as $H_3BO_4$ and the salts of boron such as $Na_2B_4O_7$.

Suitable materials for substitution of phloroglucinol would include resorcinol or phenol and similar starting materials. The freeze dried materials are slowly (<5 C/min) heated to 1100 C in a protective/reducing atmosphere (4% $H_2$-argon) to remove volatile compounds while reducing oxide compounds to carbides. Forming crystalline powder of $B_4C$ requires even higher heat treatments (>1400° C. for 4 hours) so the final product can be identified by x-ray diffraction means as $B_4C$ powders.

Example 4—Preparation of SiC Gels 1.24 grams Resorcinol, 10.0 grams EtOH, 1.97 grams Formaldehyde 37% aq., 10 grams tetramethylorthosilicate (TMOS), 1.0 ml $NH_4OH$ 28%.

To a beaker equipped with a stir bar, add resorcinol and $H_2O$ to dissolve. Add formaldehyde and TMOS. Add $NH_4OH$ to initiate sol gel process while stirring. Set up starts within 1 minute becoming opaque within the hour. Place in oven at 50° C. for 24 hrs. Remove solvent. For reaction heat treating, solid material is heat treated slowly (5 C/minute) to 1100 C and held for 4 hours at temperature. Subsequent heat treatments to >1500° C. are generally needed to convert the amorphous SiC into the desired crystal phase (6H or 4H) suitable for electrical switching applications.

Example 5—Preparation of Borides and Nitride Gels

The preparation of borides and/or nitrides is similar to the preparation of the $B_4C$ above except the amounts of hydrocarbons are reduced so that the inorganic oxide materials ($WO_3$, $TiO_2$, AlOx, MgOx, etc.) are not reduced and reacted to the carbides. Instead, the oxides react with furnace gases ($NH_3$, $H_2$, etc.) and/or chemicals in the gel mixture to form a boride ($WB_x$, $TiB_2$, $AlB_x$, $MgB_x$, etc.) and/or a nitride ($TiN_x$, $AlN_x$, $MgN_x$, $Si_xN_y$, etc.). Depending on the particle size and phase desired, the heat treatment can vary but generally requires conditions to reduce the oxides and transform the solids at >1100° C. in 4 hours.

What is claimed is:

1. A method, comprising:
   a) forming an intimate mixture of an inorganic oxide and an organic polymer,
   b) reaction heat treating the mixture to form particles of a non-oxide ceramic; and
   c) consolidating the particles into a solid ceramic object, wherein the solid ceramic object is characterized by a domain size of 100 nm or less wherein the organic polymer comprises a copolymer of an aldehyde and a mono-, di-, or trihydroxy substituted aromatic ring.

2. A method according to claim 1, wherein the non-oxide ceramic comprises a carbide.

3. A method according to claim 1, wherein the non-oxide ceramic comprises a nitride.

4. A method according to claim 1, wherein the non-oxide ceramic comprises a boride.

5. A method according to claim 1, wherein the polymer comprises a copolymer of resorcinol and formaldehyde.

6. A method according to claim 1, wherein the polymer is a polymer of trihydroxybenzene and formaldehyde.

7. A method according to claim 1, wherein the polymer is a polymer of phenol and formaldehyde.

8. A method according to claim 1, wherein step a) comprises
   a1) forming a first sol comprising an inorganic gel intermediate in a solution;

a2) forming a second sol comprising an organic gel intermediate in the solution;
a3) further reacting the solution until at least one of the first sol and second sol forms a sol gel comprising the respective inorganic oxide or organic polymer; and
a4) removing solvent from the solution to form the intimate mixture.

9. A method according to claim 1, wherein step a) comprises
a1) reacting precursors of a first sol in a solution;
a2) reacting precursors of a second sol in the solution;
a3) carrying out the reaction in the solution for a time sufficient to form a sol gel from at least one of the first and second sols; and
a4) removing solvent from the solution to form the intimate mixture,
wherein the first sol comprises an inorganic oxide and the second sol comprises a copolymer of an aldehyde and a mono-, di-, or trihydroxy substituted aromatic ring.

10. A method according to claim 1, wherein step a) comprises forming an interpenetrating network of two sol gel chemistries in a solution and then removing solvent from the solution to form the intimate mixture.

11. A method comprising
a) reacting first starting monomers of a first sol gel in a solution;
b) reacting second starting monomers of a second sol gel in the solution;
c) reacting the first and second starting monomers until at least one of the first sol gel and second sol gel is formed in the solution to form a gel mixture;
d) removing solvent from the gel mixture to form a mixture of inorganic oxide and organic polymer; and
e) reaction heat treating the mixture to form particles of a non-oxide ceramic selected from carbides, nitrides, and borides, wherein the first sol gel comprises an inorganic sol gel and the second sol gel comprises a copolymer of an aldehyde and a mono-, di-, or trihydroxy substituted aromatic ring.

12. A method according to claim 11, wherein the inorganic oxide is an oxide of boron, silicon, aluminum, magnesium, titanium, zirconium, or tungsten.

13. A method according to claim 11, wherein reaction heat treating is carried out in a hydrogen stream to form particles in the form of a carbide.

14. A method according to claim 11, wherein reaction heat treating is carried out in a nitrogen or ammonia stream to form particles in the form of a nitride.

15. A method according to claim 11, wherein the gel mixture further comprises a nitrogen compound, and the reaction heat treating produces particles of a nitride.

16. A method according to claim 11, wherein the gel mixture further comprises a boron compound, and the reaction heat treating produces particles of a boride.

17. A method comprising forming particles by the method of claim 11 and consolidating the particles to form a solid object.

18. A method according to claim 17, comprising consolidating by sintering.

19. A method according to claim 17, comprising consolidating by hot press.

20. A method according to claim 17, comprising consolidating by spark plasma sinter.

21. A method comprising
a) forming a first gel comprising an inorganic oxide in a solution;
b) forming an second gel comprising an organic polymer in the solution to form a gel mixture;
c) removing solvent from the gel mixture to form a mixture of an inorganic oxide and organic polymer; and
d) reaction heat treating the mixture to form particles of a non-oxide ceramic selected from carbides, nitrides, and borides, wherein the organic polymer comprises a copolymer of an aldehyde and a mono-, di-, or trihydroxy substituted aromatic ring.

22. A method according to claim 21, wherein in step a) the first and second gels are formed simultaneously.

23. A method according to claim 21, wherein in step a) the first gel is formed first in the solution, and then the second gel is formed in the presence of the first gel.

24. A method according to claim 21, wherein in step a) the second gel is formed first in the solution and then the first gel is formed in the presence of the second gel.

25. A method according to claim 21, wherein the polymer is a polymer of trihydroxybenzene.

26. A method according to claim 21, wherein the polymer is a polymer of dihydroxybenzene.

27. A method according to claim 21, wherein reaction heat treating is carried out in the presence of hydrogen gas and the particles comprise carbides.

28. A method according to claim 21, wherein reaction heat treating is carried out in the presence of nitrogen or ammonia, and the particles comprise nitrides.

29. A method according to claim 21, wherein reaction heat treating is carried out in the presence of a boron compound, and the particles comprises borides.

30. A method according to claim 21, wherein the gel mixture further comprises a nitrogen compound and the particles comprise nitrides.

31. A method according to claim 21, wherein the gel mixture further comprises a boron compound and the particles comprise borides.

32. A method according to claim 21, wherein the gel mixture further comprises a soluble metal cation, and the reaction heat treating is carried out under reducing conditions to form particles comprising a carbide and particles of the metal in the ground state.

33. A method comprising forming particles by the method of claim 21 and consolidating the particles to form a solid object.

34. A method according to claim 33, comprising consolidating by sintering.

35. A method according to claim 33, comprising consolidating by hot press.

36. A method according to claim 33, comprising consolidating by spark plasma sinter.

* * * * *